United States Patent Office 2,915,751
Patented Dec. 1, 1959

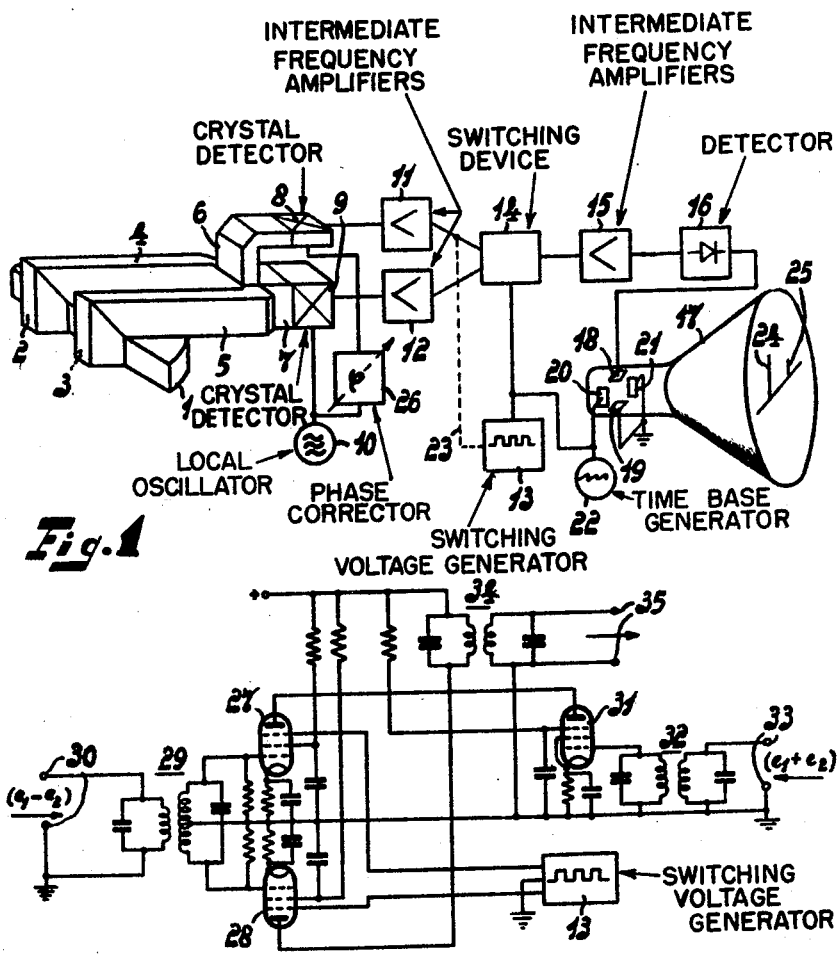

2,915,751

DIRECTION FINDER OPERATING ACCORDING TO THE AMPLITUDE COMPARISON METHOD

Frederik Johan van Hutten and Jacob van Nieuwkoop, Oestgeest, Netherlands, assignors, by mesne assignments, to North American Philips Company, Inc., New York, N.Y., a corporation of Delaware Application February 20, 1956, Serial No. 566,732

Claims priority, application Netherlands February 23, 1955

4 Claims. (Cl. 343—119)

The invention relates to direction finders for determining, according to the amplitude comparison method, the direction of reception of high frequency oscillations with respect to a guide plane which is predetermined at the receiver end, which direction finders are provided with two directive antennas having partly overlapping directional patterns and also are provided with two separate amplifier channels through which received signals are supplied to an indicator for indicating the deviation of the direction of reception from the guide plane.

In known direction finders of the kind described (cf. for example, German Patent No. 636,058) the signals which are derived from the directive antennas, for example $e_1$ and $e_2$, are amplified in separate amplifier channels, whilst the amplification factors and the phase shifts must be exactly the same in both amplifier channels in order to prevent serious errors in indication; in practice this requirement can be fulfilled only with difficulty.

In order to obviate this disadvantage it is well known to use a single amplifier which, by means of synchronous switching devices included in its input and output circuits, respectively, is alternately used for the amplification of signals from each antenna. In direction finders for very high frequency oscillations, for example, centimetre waves, and/or when the direction finder has to satisfy exacting requirements with respect to sensitivity, for example, direction finding at input voltages of approximately $10\mu$ volts or less, this solution is not useful in practice.

According to the invention, in direction finders of the kind described in the preamble, the said disadvantages are avoided by the use of a receiver having two separate amplifier channels, an addition and subtraction device being connected between the antennas and the separate amplifier channels, the two outputs of which device are each connected to one of the two antennas, the sum voltage output and the difference voltage output each being connected to the input of a separate amplifier channel, and the sum and difference voltages, after amplification in the separate amplifier channels, are supplied to a device which alternately combines them in phase and in phase opposition in order to produce two indicator voltages which are proportional to one or the other of the signals received by means of the two directional antennas.

Thus, a variation of the amplification factor and/or phase shift in one of the two amplifier channels cannot give rise to errors in indication since, when the amplitudes of the antenna signals $e_1$ and $e_2$ are equal, the difference voltage $(e_1-e_2)$ is zero and a variation of the amplification factor and/or phase shift in the separate amplifier channels cannot affect this value.

The addition and subtraction device can be designed in a variety of manners known per se. For example, the received signals $e_1$ and $e_2$ can each be supplied to a transformer having two output windings, the four windings being series-connected in pairs so that the resulting output voltages are proportional to $(e_1+e_2)$ and $(e_1-e_2)$ respectively.

For high frequencies, for example metre waves, a high frequency bridge circuit can be used having arms which consist of parallel conductors of length one quarter wavelength, the conductors of one of the arms being crossed over. When the voltages $e_1$ and $e_2$ are supplied to diagonally opposite corners of the bridge circuit, the sum voltage $(e_1+e_2)$ and the difference voltage $(e_1-e_2)$ are set up at the remaining diagonally opposite corners.

In direction finders for centimetre waves the addition and subtraction device preferably consists of four wave guides which together constitute a magic T, as is known per se, for direction finders operating according to the comparison method, in which the indicator for indicating the deviation of the direction of reception from the guide plane is controlled by indicator voltages which are proportional to the sum voltage $(e_1+e_2)$ and the difference voltage $(e_1-e_2)$ respectively of voltages $e_1$ and $e_2$ respectively which are received by means of two directive antennas having partly overlapping directional patterns.

In order that the invention may be readily carried into effect, one embodiment thereof will now be described in detail with reference to the accompanying drawing, in which Fig. 1 shows a preferred embodiment of a direction finder in accordance with the invention for centimetre waves which inter alia can be used for determining the direction of reception of pulses, whilst Fig. 2 shows in detail a favorable circuit arrangement of a switching device for use in the direction finder shown in Fig. 1.

Fig. 1 shows a direction finder for, for example, centimetre pulse waves. In this direction finder, use is made of an antenna reflector 1 having a parabolic rear wall. On each side of the focal plane of this antenna provision is made of wave guides 2 and 3 respectively which are open at the side nearer the parabolic rear wall. As is well known, such an antenna provides overlapping directional patterns. The wave-guides 2 and 3 are connected through connecting guides 4, 5 to opposite inputs of a magic T comprising four wave-guide lengths. The outputs 6 and 7 of this magic T are connected to two crystal detectors shown diagrammatically at 8 and 9. These crystal detectors act as mixer stages and are connected to a local oscillator 10. The intermediate frequency pulses derived from said mixer stages are supplied through intermediate frequency amplifiers 11, 12 to a switching device 14 which is connected to a switching-voltage generator 13 and through which the pulses are alternately combined in phase and in phase opposition and supplied to a further intermediate frequency amplifier 15 and a detector 16. The use of the switching device 14 at this point of the circuit arrangement does not give rise to difficulty in practice due to the comparatively low frequency and the high level of the input signals, whilst it eliminates the need for duplication of the subsequent signal cascade.

On reception of oscillations from the direction of the guide plane, the amplitudes and phases of the voltages $e_1$ and $e_2$ taken from antennas 2 and 3 are equal. The difference voltage $(e_1-e_2)$ produced by these voltages, which is supplied to the intermediate frequency amplifier 12, in this case has zero value. When the received voltages $e_1$ and $e_2$ are identical, the sum voltage $(e_1+e_2)$ derived from the addition and subtraction device 6 is equal to $2(e_1)$. This voltage is supplied to an intermediate frequency amplifier 11. Differences in the amplification factors and phase shifts in the intermediate frequency amplifiers cannot give rise to errors in indication from the direction of the guide plane, since, as has been mentioned hereinbefore, the difference voltage has zero value.

On the reception of oscillations from a direction such with respect to the guide plane that the output voltage of antenna 2 exceeds the output voltage of antenna 3, the difference voltage $(e_1-e_2)$ will have a value which differs from zero value and the phase of which corresponds to the phase of the sum voltage $(e_1+e_2)$. Thus disparity of the intermediate frequency amplifier can give rise to errors in indication, but only with respect to the value of the deviation from the direction of the guide plane and not with respect to the indication of the guide plane itself.

In the direction finder shown in Fig. 1, as an indicator use is made of a cathode-ray tube 17 provided with vertical deflecting plates 18, 19 and horizontal deflecting plates 20, 21. The deflecting plates 19 and 21 are connected to one another and to earth. The vertical deflecting plate 18 is connected to the output of the detector 16 whilst the horizontal deflecting plate 20 is connected to a time base generator 22.

The voltages which are amplified in the intermediate frequency amplifiers 11 and 12, consequently are proportional to the said sum and difference voltages. By the switching device 14, an embodiment of which will be described in detail with reference to Figure 2, the intermediate frequency input voltages are combined alternately in phase and in phase opposition. As a result, the output voltage of the switching device 14 is alternately proportional to the pulse voltages $e_1$ and $e_2$ which through the intermediate frequency amplifier 15 and the detector 16 control the vertical deflection of the cathode-ray tube 17. With suitable synchronism of the switching voltage generator 13 and the time base generator 22, on reception of high frequency pulses, pulses having an amplitude proportional to the pulse voltage $e_1$ and pulses having an amplitude proportional to the pulse voltage $e_2$ will be reproduced alternately. As is well known per se, when the switching voltage generator is synchronized with the received pulses by means of a connection indicated by the broken line 23, a mutual shifting of the time axes for the pulse voltages $e_1$ and $e_2$ enables the production, on the screen of the cathode-ray tube 17, of juxta-positioned images of the received pulses as shown by 24 and 25.

On the reception of pulses from the direction of the guide plane, the pulses reproduced on the screen of the indicator will have equal amplitudes. If the direction of reception deviates from the direction of the guide plane to the left or to the right, the pulse reproduced on the image screen at the left hand or the right hand side respectively will show the greatest amplitude. As has been described hereinbefore, relative variations of the amplication factors and phase shifts in the separate amplifier channels 11 and 12 and the preceding mixer stages 8 and 9 will not give rise to errors in indication on the reception of pulses from the direction of the guide plane. Such variations only cause a deterioration of the indicating sensitivity. A relative phase shift of the separate amplifier channels can be corrected in a simple manner by inserting in one of the leads connecting the local oscillator 10 to the mixer stages 7, 8 an adjustable phase corrector 26 which, for example, may be a wave guide of adjustable length.

Fig. 2 shows in detail one embodiment of the switching device 14 of Fig. 1 which has proved satisfactory in practice. This switching device includes two pentodes 27 and 28 the control grids of which are connected in push-pull to the secondary of an intermediate frequency input transformer 29. The primary of this intermediate frequency transformer through terminals 30 is connected to the output of the difference voltage amplifier 12 of Fig. 1.

Provision is made of a third pentode 31, the control grid of which through an intermediate frequency transformer 32 having input terminals 33 is connected to the sum voltage amplifier 11 of Fig. 1.

The said three pentodes 27, 28 and 31 have a common output impedance comprising an intermediate frequency transformer 34 the output of which through terminals 35 is connected to the intermediate frequency amplifier 15 of Fig. 1.

In order to combine the sum and difference voltages which are supplied through input terminals 33 and 30 alternately in phase and in phase opposition, the push-pull connected pentodes 27 and 28 are alternately cut off by the switching voltage generator 13. This generator supplies a square wave alternating voltage which is supplied in push-pull to the suppressor grids of the pentodes 27 and 28 and thus alternately cuts off the pentode 27 and the pentode 28. According to whether the pentode 28 or the pentode 27 is cut off, at the output terminals 35 an output voltage is set up which is proportional to the pulse voltage $e_1$ or to the pulse voltage $e_2$.

Here it should be mentioned that the electronic switching device shown in Fig. 2 is to be preferred to mechanical switching devices which in principle may obviously also be used, for, particularly in the process of finding the direction of reception of very high frequency pulse oscillations, it has been found desirable to use a switching frequency of some thousands of cycles per second in order to prevent comparatively low frequency fading phenomena from affecting the obtained indication. Accidental equality of switching frequency and fading frequency gives rise to errors in indication, which errors have been found to be substantially reduced by the use of the said high switching frequency.

What is claimed is:

1. A direction finder system for determining the direction with respect to a guide plane of a source of high-frequency oscillations, comprising two directive antennas having partly overlapping directional patterns, a first channel and a second channel, a signal-adding device connected between said two antennas and the input of said first channel, a signal-subtracting device connected between said two antennas and the input of said second channel, a switching device connected to the outputs of said first and second channels for combining the output signals of said channels alternately in phase and in phase opposition, a deviation indicator, and means connecting the output of said switching device to said deviation indicator.

2. A direction finder as claimed in claim 1, including first and second mixer stages respectively interposed at the inputs of said first and second channels, a local oscillator connected to said mixer stages, and means for varying the relative phase of the oscillations fed from said local oscillator to said mixer stages.

3. A direction finder as claimed in claim 1, in which said switching device includes a switching-voltage generator for controlling the switching thereof, and in which said deviation indicator comprises a cathode-ray tube, a deflection generator for deflecting the electron beam of said tube in a first direction and connected to be synchronized by said switching-voltage generator, and deflecting means connected to deflect said electron beam in a direction perpendicular to said first direction in accordance with the output signal of said switching device.

4. A direction finder as claimed in claim 3, in which said switching device comprises two amplifier stages connected in push-pull, means connecting the output of said second channel in a push-pull connection to the inputs of said amplifier stages, means connecting said switching-voltage generator to said amplifier stages in push-pull, and a third amplifier stage having an input connected to the output of said first channel and having an output connected in common to the outputs of said two push-pull amplifier stages.

References Cited in the file of this patent

UNITED STATES PATENTS

| | | |
|---|---|---|
| 2,456,666 | Agate | Dec. 21, 1948 |
| 2,619,635 | Chait | Nov. 25, 1952 |
| 2,682,656 | Phillips | June 29, 1954 |
| 2,687,520 | Fox | Aug. 24, 1954 |